United States Patent [19]

Schweitzer, III et al.

[11] Patent Number: 5,602,707
[45] Date of Patent: Feb. 11, 1997

[54] DETECTION OF TRANSFORMER HIGH SIDE FUSE OPERATIONS IN A POWER TRANSMISSION SYSTEM

[75] Inventors: Edmund O. Schweitzer, III, Pullman, Wash.; Jeffrey B. Roberts, Moscow, Id.

[73] Assignee: Schweitzer Engineering Laboratories, Inc., Pullman, Wash.

[21] Appl. No.: 546,481

[22] Filed: Oct. 20, 1995

[51] Int. Cl.$^6$ ........................................... H02H 7/04
[52] U.S. Cl. ................................. 361/35; 361/86; 361/85
[58] Field of Search ........................... 361/41, 35, 36–39, 361/78, 85–86, 103–104, 76

[56] References Cited

U.S. PATENT DOCUMENTS

| | | | |
|---|---|---|---|
| 3,584,259 | 6/1971 | Traub et al. | 361/85 |
| 4,357,644 | 11/1982 | Schmidt | 361/76 |
| 4,366,474 | 12/1982 | Loewenstein | 340/658 |

Primary Examiner—Jeffrey A. Gaffin
Assistant Examiner—Michael J. Sherry
Attorney, Agent, or Firm—Jensen & Puntigam, P.S.

[57] ABSTRACT

Voltage comparisons are made for each of the phase-phase voltages on a low side of a distribution transformer in a power system against a threshold, approximately 0.7 nominal secondary voltage, which is less than the value of at least one phase-phase voltage when only one high side fuse has operated. High outputs result when the phase-phase voltages exceed the threshold. At the same time voltage comparisons are made of each of the phase-phase low side voltages and a second threshold, approximately 0.2 nominal secondary voltage, which is substantially less than the first threshold. High outputs result when the voltages are below the threshold. A circuit output is provided which can be used to trip a low side circuit breaker when at least one output of the first comparisons is high and at least one output of the second comparisons is high.

4 Claims, 2 Drawing Sheets

5,602,707

DETECTION OF TRANSFORMER HIGH SIDE FUSE OPERATIONS IN A POWER TRANSMISSION SYSTEM

TECHNICAL FIELD

This invention relates generally to fuse protection for power transmission systems and more specifically concerns apparatus for detecting the operation of a fuse on the high side of a power distribution transformer in such a system.

BACKGROUND OF THE INVENTION

In some power transmission systems, fuses are used for protection on the high side (primary) of distribution transformer banks. Such fuse protection is frequently found, for instance, in delta-wye connected distribution transformer banks, particularly in those situations where the distribution load does not warrant the cost of installing circuit breakers on the high side of the transformer banks. When the fuse(s) for one or more of the three phases on the high side of the distribution transformer operates, i.e. blows, unbalanced voltages are applied to the transformer bank as well as to the load which is connected to the low side (secondary) of the transformer bank. With respect to the load, which may for example be an induction motor, the unbalanced voltage will cause a significant amount of negative sequence current to flow in the load, which may damage the load if it is present for too long a time period. In addition, the resulting circulating current in the delta-wye connected transformer bank caused by the unbalanced voltages will heat the distribution transformer bank, perhaps to the point where the transformer bank may be lost, which is expensive and time-consuming to replace.

High side transformer fuses, while usually reliable, can fail for a variety of reasons, including a specific fault condition, or they can be progressively weakened by previous events which are insufficient to cause them to operate and then fail later spontaneously. In any event, the consequences of a high side fuse operating (blowing) are potentially severe, both to the load and to the transformer bank itself, regardless of the cause of the operation. Hence, it is desirable to develop a simple, low cost detection system for detecting high side fuse operations which can then be used to trip distribution breakers or a low side bank breaker to protect the transformer and/or the load. It would be particularly desirable if such a detection system could be incorporated in the protective relays which are used to protect the distribution lines on the low side of the transformer bank.

SUMMARY OF THE INVENTION

Accordingly, the present invention is an apparatus for detecting the operation of a voltage transformer high side fuse in a power transmission system, comprising: means for monitoring the phase-phase voltages of the low side of the voltage transformer; means for producing a signal for tripping a circuit breaker on the low side of the transformer, if at least one phase-phase low side voltage approaches zero and any other phase-phase voltages remain above a first threshold; and means for preventing the tripping signal if all of the phase-phase low side voltages are above a second threshold which is substantially less than the first threshold and also less than the expected value of said other phase-phase low side voltages when one high side fuse operates.

BEST MODE FOR CARRYING OUT THE INVENTION

Figure 1:
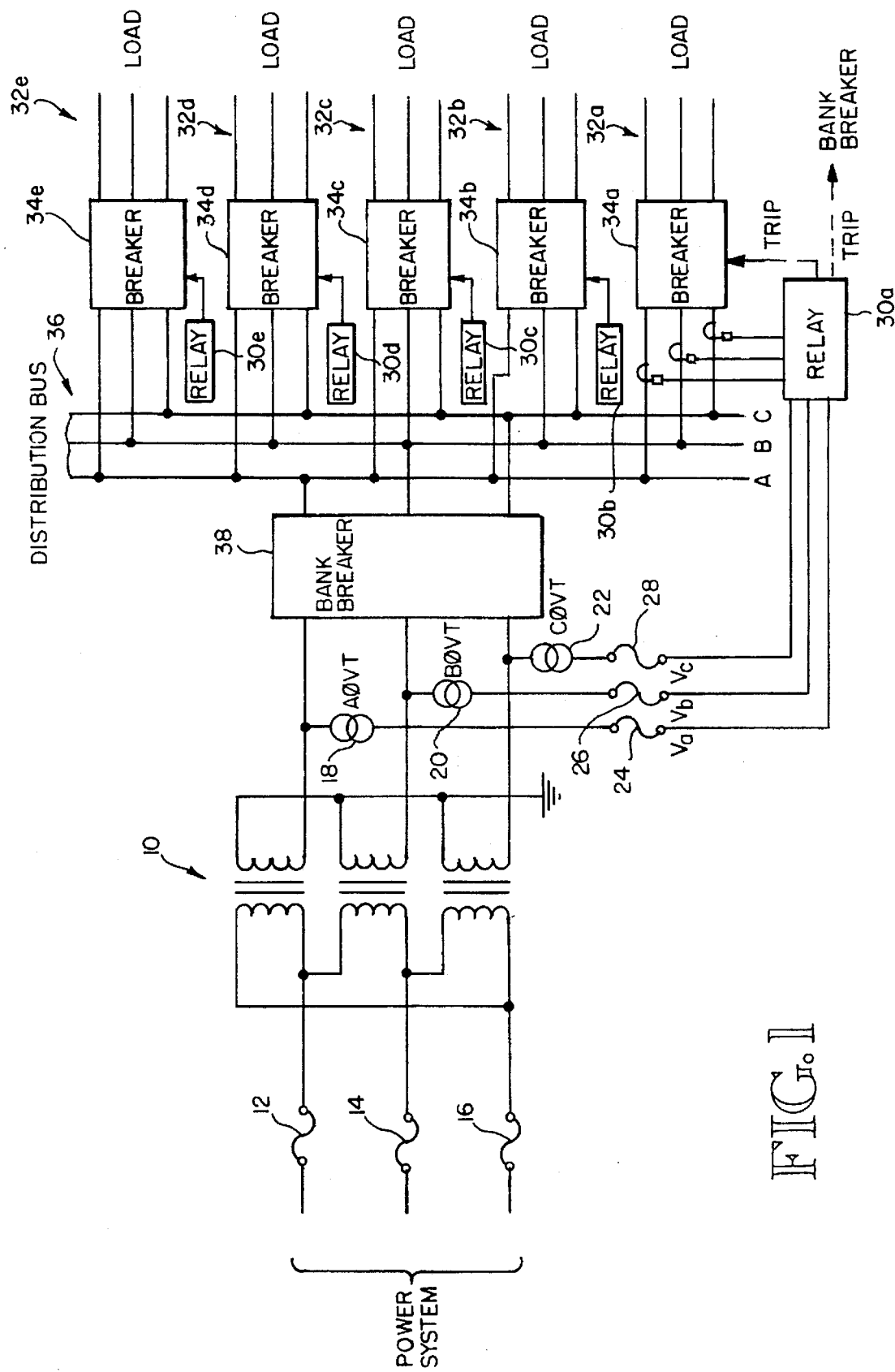
FIG. 1 is a circuit diagram showing a distribution transformer bank with high side fuses and low side distribution feeder elements, as well as the load on those feeder elements.

FIG. 1 shows a distribution power transformer bank generally at 10 comprising primary and secondary windings for A, B, and C phase power signals from a power system. On the high side of the transformer bank 10 are the A, B and C phase input lines, which have "high side" fuses 12, 14 and 16 therein, respectively. On the low side of the power transformer bank 10 are A phase, B phase and C phase voltage transformers (VTs) 18, 20 and 22, respectively, each of which are connected through VT fuses 24, 26 and 28, respectively, to protective relays 30a–30e, each of which is associated with a feeder line 32a–32e. Each of the feeder lines is connected in turn to an associated load. While 5 feeder lines and relays are shown, this is for illustration only and fewer or more feeder lines could be used.

The feeder lines 32a–32e each have a circuit breaker 34a–34e associated therewith. The feeder lines 32a–32e extend from a distribution bus 36, which in turn is connected to the low side of the distribution power transformer bank 10. A low side transformer bank breaker 38 may also be included in some systems, although other systems will not have such a bank circuit breaker.

The high side nominal voltage levels to transformer bank 10 will vary depending upon the particular system application. Generally, fuses are used where the input voltage levels are well below typical transmission line levels, although fuses have been commonly used to protect high side voltages of up to 115 kilovolts (kv). In FIG. 1, the complete lowside line connections for voltage and current sampling are shown for only one relay 30a and its associated feeder line and circuit breaker. It should be understood that similar connections are made for the other relays 30b–30e. Those lines are not shown for simplicity of illustration. If a fault condition is detected by relay 30a, for instance, because of out-of-tolerance voltage and/or current conditions, the relay will trip its associated breaker.

The present invention quickly and accurately identifies a high side blown fuse and furthermore is capable of also distinguishing that condition from a low side blown VT fuse. High side and low side blown fuses have certain effects on the circuit arrangement of FIG. 1. When one high side fuse operates, one associated low side phase-phase voltage goes low, approximately to zero, while the other two low side phase-phase voltages decrease only to approximately 0.87 of the nominal phase-phase low side voltage. For example, if the A phase high side fuse 12 blows, then the low side VAB (phase A-phase B voltage) will go to zero, while the VBC and VCA values will be 0.87 nominal voltage. Corresponding low side phase-phase voltage patterns result from high side phase B or phase C fuses operating. If two or all of the high side fuses operate, all of the low side phase-phase voltages will go low, to approximately zero.

Operation of low side VT fuses will have different effects on the low side phase-phase voltages. If one low side VT fuse blows, for example, the A phase VT fuse 24, two of the low side phase-phase voltages, i.e. VAB and VCA, will go to 0.58 nominal phase-phase voltage while VBC remains at nominal voltage. If two low side fuses operate, for example, phase A and phase B, fuses 24 and 26, the low side VAB will go to zero, while VBC and VCA will go to 0.58 nominal voltage. If all three low side fuses operate, then all of the low side phase-phase voltages will be zero.

Figure 2:
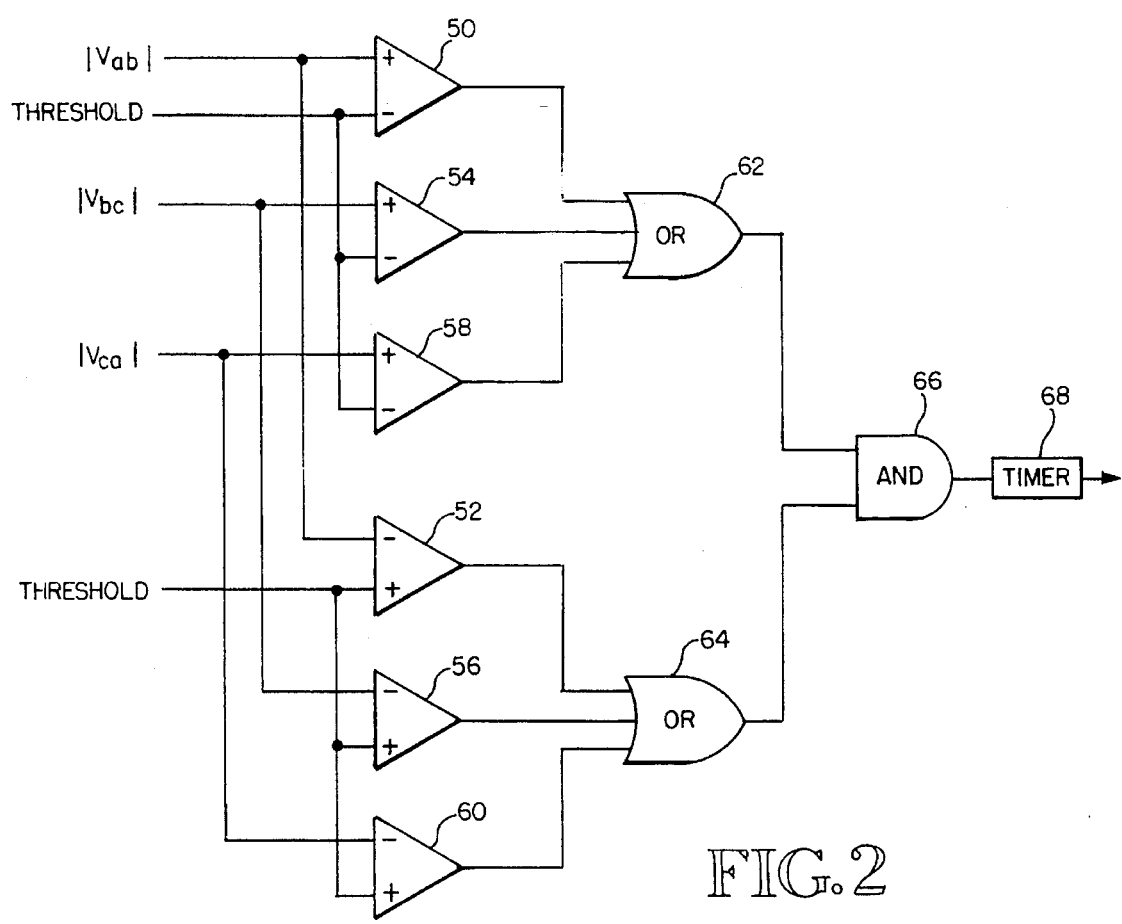
FIG. 2 is a logic diagram showing the present invention.

The invention uses the above-described effects to detect high side fuse operations and to differentiate high side fuse operation from low side fuse operation. A circuit which recognizes high side fuse operation, while excluding low side fuse operations, is shown in FIG. 2. The absolute value of the three low side phase-phase voltages, VAB, VBC and VCA, respectively, are applied to two sets of comparators, with VAB being applied at the positive input of comparator 50 and the negative input of comparator 52. VBC is applied to the positive input of comparator 54 and the negative input of comparator 56. VCA is applied to the positive input of comparator 58 and the negative input of comparator 60.

Applied to the negative inputs of the first set of comparators 50, 54 and 58 is a first threshold value of 0.7 nominal low side (secondary) phase-phase voltage. This is below the 0.87 nominal value of two low side phase-phase voltages when one high side fuse operates, but above the value of the other low side phase-phase voltage, which is approximately zero. Applied to the positive inputs of the second set of comparators 52, 56 and 60 is a second threshold value of 0.2 nominal secondary phase-phase voltage, which is below the 0.58 nominal value of two low side phase-phase voltages as well as the 1.0 nominal value of the other low side phase-to-phase voltage when one low side VT fuse operates.

The outputs of comparators 50, 54 and 58 are applied to an OR gate 62, while the outputs of comparators 52, 56 and 60 and applied to OR gate 64. The outputs of OR gates 62 and 64 are applied to an AND gate 66. Hence, if any one or more of the phase-phase voltages VAB, VBC or VCA are above 0.7 nominal secondary voltage, high outputs from the corresponding one or more comparators 50, 54 and/or 58 are applied to OR gate 62, which in turn applies a high input to one input of AND gate 66. Also, if any one of the phase-phase voltages is less than 0.2 nominal, there will be a high input to the other input of AND gate 66 from OR gate 64. If only one high side fuse blows, then the output of two of the comparators 50, 54 or 58 will be high, and one of the comparators 52, 56 and 60 will be high, depending upon which high side fuse blows, while if two or more high side fuses blow, then all three comparator (50, 54, 58) outputs will be low, and there will be a low input to AND gate 66 from comparator 62. A high output from AND gate 66 is a trip signal (assert) for the circuit breaker.

At the same time, comparators 52, 56 and 60 insure the exclusion of the low side fuse operation when there is no high side fuse operation. There will be no high outputs from comparators 52, 56 or 60 when just one low side fuse blows, since all of the low side phase-phase voltages are above the second threshold of 0.2 nominal, with VAB and VCA being 0.58 nominal and VBC being nominal for a blown low side phase A fuse, for example. Further, while there will be a high output from one of the comparators 52, 56 or 60 when there are two blown low side fuses, all of the outputs of comparators 50, 54 and 58 are low because the phase-phase secondary voltages will all be below the first threshold of 0.7 nominal. In either case, one of the outputs of OR gates 62 or 64 will be low. The output of AND 66 is then low and there will be no assert signal from the relay to trip a breaker. The trip signal from AND gate 66 is thus prevented.

When a high side fuse operation occurs, as explained above, the outputs of both OR gates 62 and 64 are high, as explained above. The output of AND gate 66 is thus also high. Referring now again to FIG. 1, the output of AND gate 66 can be used to set selected output contacts on relay 30a, which in turn will result in a trip signal to either the corresponding distribution breaker 34a, or to bank breaker 38 (if there is one), depending on the user's desire, which is programmed into the relay.

The output of AND gate 66 may also be used to initiate a delay timer 68 of approximately 300–600 cycles, i.e. 5–10 seconds. This delay provides coordination with the pickup condition of the relay if there is an actual fault on the line.

Hence, a system for detecting high side blown fuses has been described. An advantage of the system is its security, simplicity and low cost, since it can be readily incorporated in existing microprocessor-based relays which are used to protect individual feeder lines.

Although a preferred embodiment of the invention has been disclosed herein for illustration, it should be understood that various changes, modifications and substitutions may be incorporated in such embodiment without departing from the spirit of the invention which is defined by the claims as follow:

What is claimed is:

1. An apparatus for detecting the operation of a power voltage transformer high side fuse in a power transmission system, comprising:

means for monitoring the phase-phase voltages of the low side of the voltage transformer;

means for producing a signal for tripping a circuit breaker on the low side of the voltage transformer, if at least one phase-phase low side voltage approaches zero and other phase-phase low side voltages remain above a first threshold; and means for preventing the tripping signal if all of the phase-phase low side voltages are above a second threshold, which is substantially less than the first threshold and also less than the expected value of said other phase-phase low side voltages when one high side fuse operates.

2. An apparatus of claim 1, further including means for preventing the tripping signal when all of the phase-phase low side voltages are below the first threshold.

3. An apparatus of claim 1, wherein the first threshold is approximately 0.7 nominal secondary voltage.

4. An apparatus of claim 1, wherein the second threshold is approximately 0.2 nominal secondary voltage.

* * * * *